(12) United States Patent
Poplack et al.

(10) Patent No.: US 11,474,844 B1
(45) Date of Patent: Oct. 18, 2022

(54) EMULATOR SYNCHRONIZATION SUBSYSTEM WITH ENHANCED SLAVE MODE

(71) Applicant: CADENCE DESIGN SYSTEMS, INC., San Jose, CA (US)

(72) Inventors: Mitchell G. Poplack, San Jose, CA (US); Justin Schmelzer, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 106 days.

(21) Appl. No.: 17/247,927

(22) Filed: Dec. 30, 2020

(51) Int. Cl.
  G06F 9/445 (2018.01)
  G06F 9/455 (2018.01)
(52) U.S. Cl.
  CPC ............... *G06F 9/45508* (2013.01)
(58) Field of Classification Search
  CPC .................................. G06F 9/45508
  USPC .................................. 703/26
  See application file for complete search history.

(56) References Cited

U.S. PATENT DOCUMENTS

| 2011/0307233 | A1* | 12/2011 | Tseng | G06F 30/33 |
| | | | | 703/21 |
| 2013/0007332 | A1* | 1/2013 | Teh | G06F 13/385 |
| | | | | 710/313 |
| 2016/0292334 | A1* | 10/2016 | Rabinovitch | G06F 30/331 |

* cited by examiner

*Primary Examiner* — Timothy A Mudrick
(74) *Attorney, Agent, or Firm* — Foley & Lardner LLP

(57) ABSTRACT

Embodiments described herein include an emulator system having a synchronization subsystem comprising devices, organized in logical hierarchy, controlling synchronization of a system clock and system components during emulation execution. The devices of the logical hierarchy communicate bi-directionally, communicating status indicators upwards and execution instructions downwards. A TCI is designated "master TCI" and others are designated "slave TCIs." The master TCI asserts a RDY status that propagates upwards to a root node for a number cycles. The slave TCIs execute in "infinite run" and continually assert the RDY status upwards to the root device regardless of the cycle count. The root node detects each RDY status and propagates downwards a GO instruction to the master TCI and the slave TCIs. In this way, the TCIs execute until the master TCI de-asserts RDY status. The result is only the master TCI is manipulated to, for example, start/stop emulation or perform iterative execution.

20 Claims, 5 Drawing Sheets

EMULATOR SYNCHRONIZATION SUBSYSTEM WITH ENHANCED SLAVE MODE

TECHNICAL FIELD

This application generally relates to emulator systems, including systems and methods for controlling synchronization of emulator system components and performance, including systems and methods for efficiently controlling electronic devices for managing emulator timing and execution cycles of the emulator system components.

BACKGROUND

Manufacturing integrated circuits (ICs) or other logic system is expensive, rendering testing and verification efforts for new logic system designs cost-prohibitive or cost inefficient. Emulation systems offer a much less expensive and more reliable way of verifying the design prior to actually producing the logic system. Emulation systems comprise hardware logic components, including emulation chips with emulation processors, for processor-based (i.e., hardware-based). By executing various forms of programmable logic on the processor-based emulation chips, the emulation chips may be designed to mimic the functionality of nearly any IC or other logic system design that is undergoing testing.

Such hardware emulation systems may include hundreds or thousands of emulation processors that collectively emulate the functionality of the logic system design under test (DUT). In many cases, these emulation processors include reprogrammable application-specific integrated circuits (ASICs) that function synchronously according to one or more system clocks. The emulation chips may comprise hardware components, such as processors, capable of processor-based (e.g., hardware-based) emulation of logic systems, such as ASICs, to test the capabilities of the new design. These processor-based emulators sequentially evaluate combinatorial logic levels, starting at the inputs and proceeding to the outputs. Each pass through the entire set of logic levels and instructions is a "cycle" and the evaluation of each individual logic level is an emulation "step".

The emulation processors are generally arranged into groups of processors known as "clusters." Each emulation processor performs an identical set of functions, such as retrieving data from a memory, evaluating the data, and writing the processed result back into either the same or different memory. Emulation processors typically address the memory via an instruction word. The instruction word is stored in an instruction memory and contains a read address for the data to be evaluated and a Boolean function table that instructs the processor on how to evaluate the data. The emulation processor then stores the produced result back to the same memory location as indicated by the instruction address.

When the designer and the emulator operate in a less-interactive manner, and/or when the emulator is instructed to run a massive number of cycles, then the designer typically does not care about the amount of time needed for the emulation system to send information to the host system. But certain use modes of the test bench allow the designer to interact with the emulator slowly (e.g., incrementally in lockstep). The designer or the emulation system frequently and abruptly start or stop emulation execution. One or more field programmable gate arrays (FPGAs) or other logical devices, such as timing control interfaces (TCIs), control execution of the emulation chips and processors to maintain synchronization and/or perform various administrative tasks associated with execution. For example, the designer and the compiler might inject breakpoints into the virtual logic allowing the designer to review the design's execution behavior, step-by-step or for a predetermined number of cycles.

Execution according to these various use modes can hurt performance and the user experience (e.g., substantial time needed to produce run reports). The level of control over the emulation system's components and the virtual logic can be inefficient to implement due to the large quantities of emulation components involved with the emulation and the requirement to maintain synchronization. What is needed is a way to efficiently manipulate as few devices as necessary, minimizing the amount of logic processes in order to, for example, halt emulation, execute the emulation, or execute a certain number of execution cycles.

SUMMARY

Disclosed herein are systems and methods capable of addressing the above-described shortcomings and may also provide any number of additional or alternative benefits and advantages. Embodiments described herein provide for an emulator system having a synchronization subsystem for controlling execution and synchronization across devices. The components of the synchronization subsystem are organized as a logical hierarchy (e.g., sync tree) of electronic devices that control clock synchronization. The devices of the sync tree communicate bi-directionally, communicating status indicators (e.g., ready ("RDY") status) upwards and execution instructions (e.g., GO instruction) downwards. One of the TCIs is designated a "master TCI" and the others are designated "slave TCIs." The master TCI asserts a RDY status that propagates upwards to a root node device for a given number cycles. The slave TCIs execute in an "infinite run" mode and continually assert the RDY status upwards to the root device regardless of the cycle count. The root node detects each RDY status and propagates downwards a GO instruction to the master TCI and the slave TCIs. In this way, the TCIs execute until the master TCI de-asserts the RDY status. The result is that only the master TCI must be manipulated in order to, for example, start/halt execution, pause/unpause execution, or perform an iterative execution of emulation cycles.

In an embodiment, a method for managing execution of an emulator system in which the method comprises receiving, by a synchronization chip, a plurality of state indicators from a plurality of slave board timing control device for a plurality of first emulation chips associated with the plurality of slave board timing control devices, the plurality of state indicators indicating a ready state corresponding to the first emulation chips; and responsive to the synchronization chip receiving a state indicator from a master board timing control device for a second emulation chip associated with the master board timing control device indicating a master ready state for the second emulation chip, transmitting, by the synchronization chip, an execution instruction to the plurality of slave board timing control devices and to the master board timing control device.

In another embodiment, an emulation system comprises a plurality of emulation chips configured to perform portions of emulation cycles; a plurality of slave board timing control devices configured to control execution timing of a plurality of first emulation chips of the plurality of emulation chips; a master board timing control device configured to control execution timing of a second emulation chip of the plurality of emulation chips; and a synchronization chip. The synchronization chip is configured to receive from the plurality of slave board timing control devices a plurality of state indicators corresponding to the plurality of first emulation chips indicating a ready state; receive from the master board timing control device a state indicator for the second emulation chip indicating a master ready state for the second emulation chip; and transmit an execution instruction to the plurality of slave board timing control devices and to the master board timing control device in response to receiving the master ready state.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
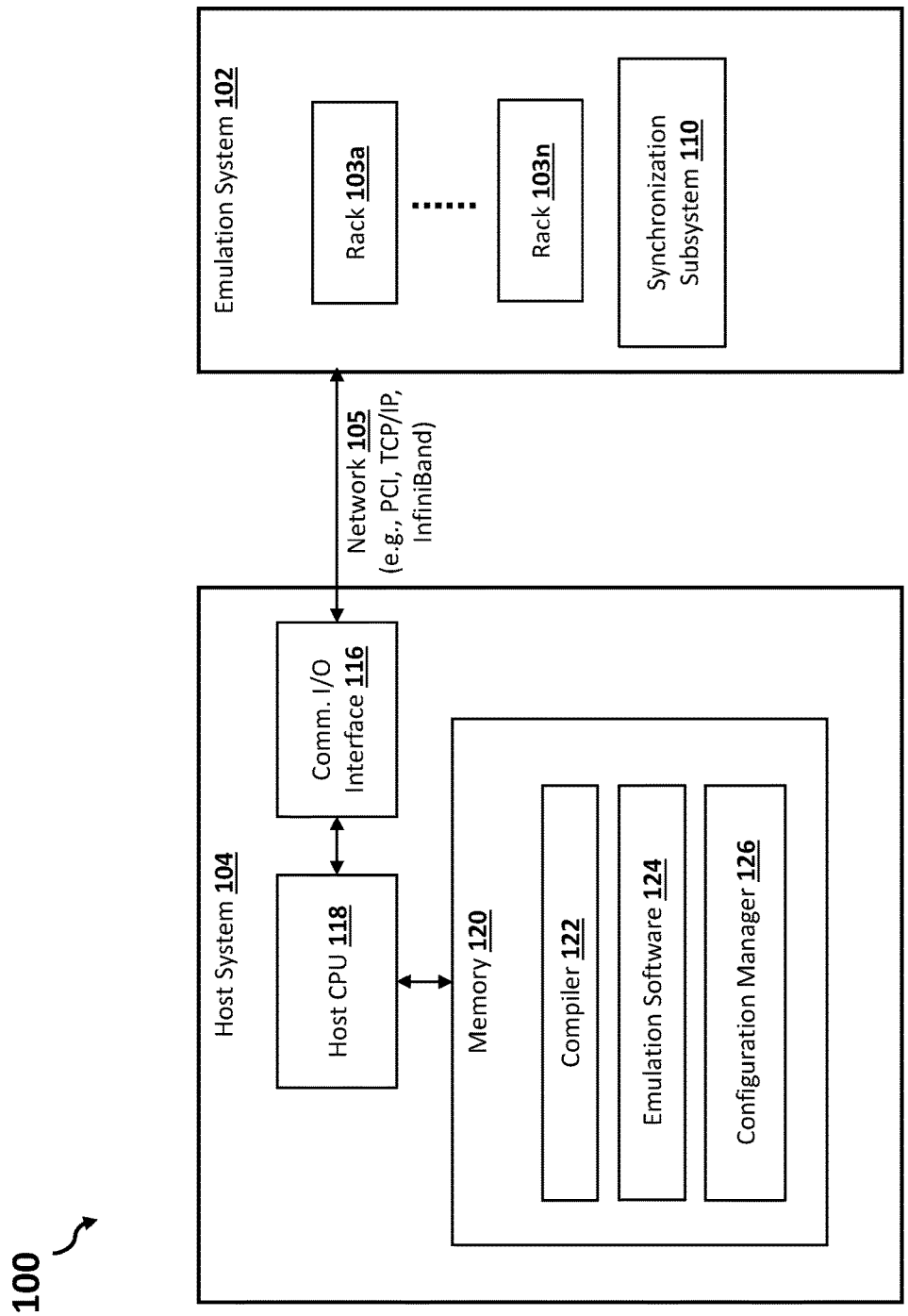
FIGS. 1A-1C shows components of a system for performing emulation of a logic system design, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein provide for a synchronization subsystem of an emulation system that controls execution and clock cycles through a logical synchronization tree structure (may be referred to as a "sync tree") representing the logical, hierarchical relationships of components allocated to execute virtual logic of a DUT The components of the sync tree are associated with corresponding FPGAs, such as TCIs, controlling execution by the emulator components represented by a given node of the sync tree. The FPGAs report upwards a ready state ("ready" or "RDY" state) and trigger execution in response to an execution instruction ("execute" or "GO" instruction). The modified synchronization subsystem described herein puts all but one of the TCIs of the sync tree into a "slave" mode, so that fewer leaves require accesses from the host software's test bench to start/stop the emulation. Rather, one TCI operates in a "master" mode that triggers starts/stops across the sync tree, requiring only a single access. The subsystem includes optional operational modes to request single-step and pause/unpause for more efficient control.

Example Components for Emulation

Figure 1B:
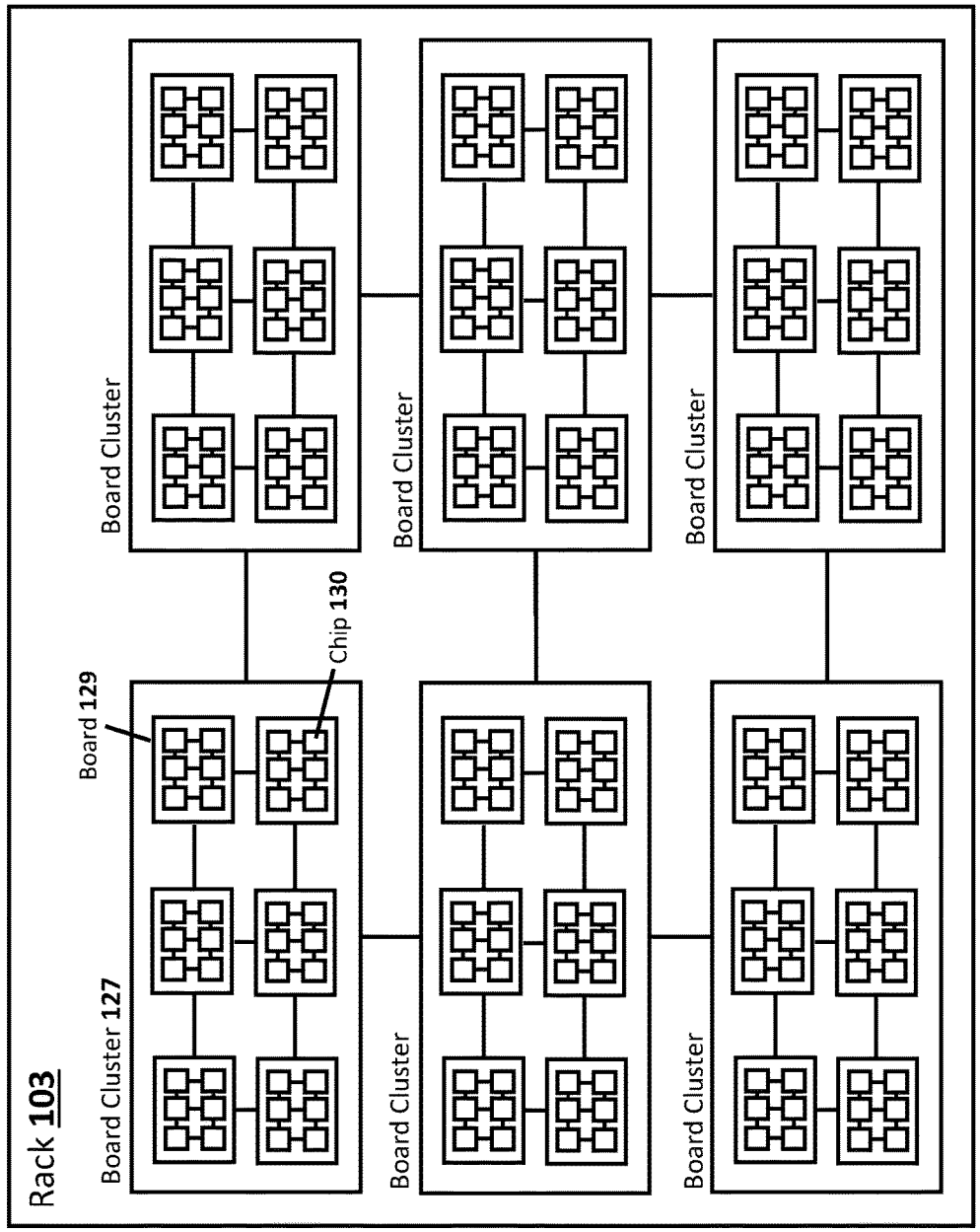
Figure 1C:
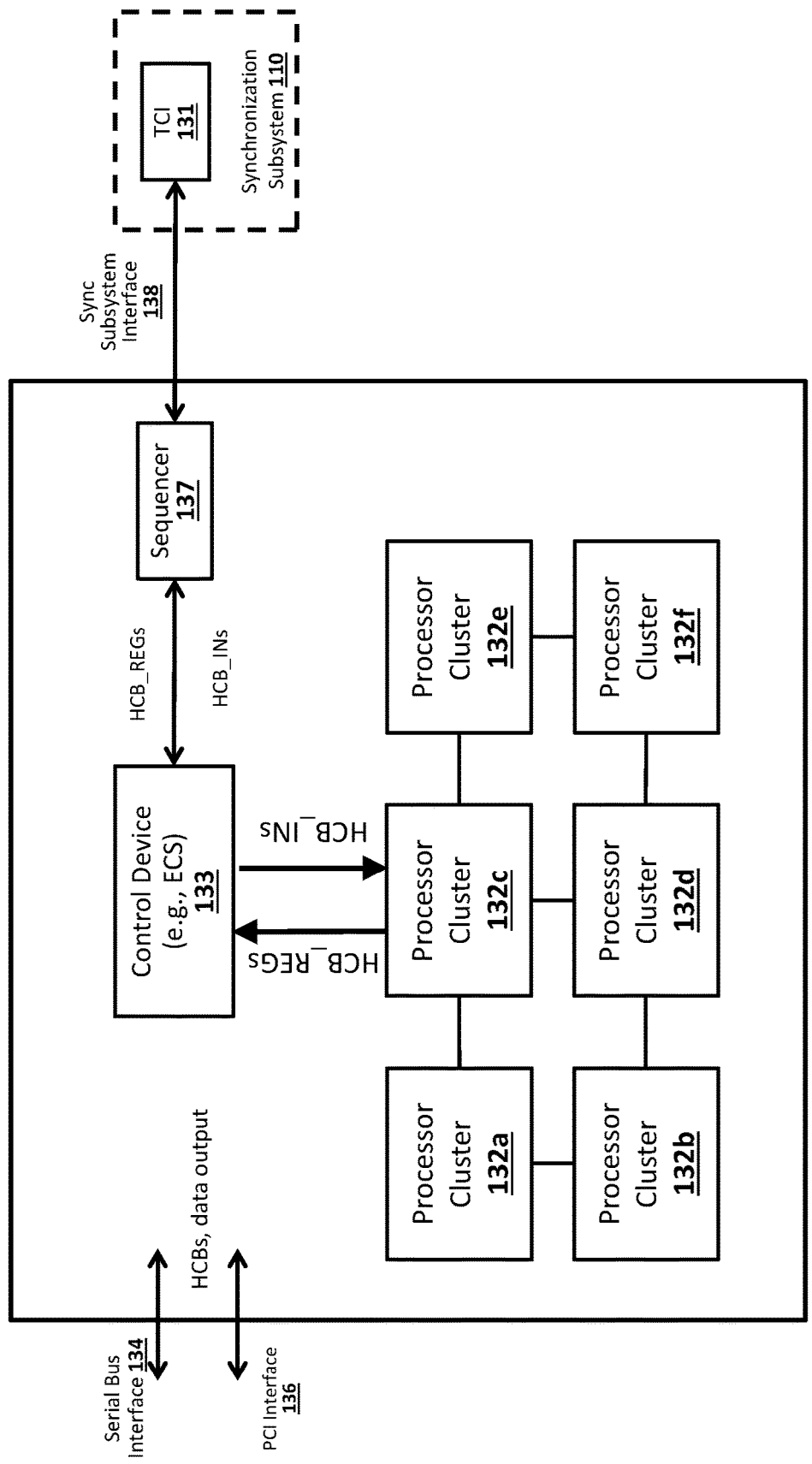

FIGS. 1A-1C shows components of a system 100 for performing emulation of a logic system design, including an emulation system 102 that communicates, via a communication link 105, to a host system 104 that executes management software (sometimes referred to as a "test bench"). The emulation system 102 includes components allowing the emulation cycles to proceed at a predetermined number of cycles, start execution, or halt execution by manipulating a single synchronization device of the emulation logic boards, causing a synchronization device to send signals to one or more emulation processors or other components to start execution or halt execution.

FIG. 1A is a block diagram showing components of the host system 104 and the emulation system 102, which are in communication with each other via the communication link 105. The communication link 105 comprises any number of computing hardware and software components establishing a bus or link between computing devices using any number of communication protocols. In operation, the communication link 105 conducts data and/or instruction transfer between the host system 104 and the emulation system 102. Non-limiting examples of the communication link 105 include a Peripheral Component Interconnect (PCI) bus, which may be a PCI express (PCIe) bus, TCP/IP, or InfiniBand®, among other types of communication links 105.

Host System

The host system 104 may be any computing device comprising a host processor 118, a host memory 120, and one or more communication I/O interfaces 116. The host system 104 may further include any number of support circuits, such as cache memory, power supply, clock circuits, data registers, and the like. The host processor 118 of the host system 104 may include circuitry configured to execute the various processes and tasks described herein. Non-limiting examples of the host processor 118 of the host system 104 may include an x86 central processing unit (CPU), an ARM processor, a Reduced Instruction Set Computing (RISC) processor, an ASIC processor, or a Complex Instruction Set Computing (CISC) processor, among others.

The host memory 120 of the host system 104 may store various forms of software programs and files for execution by the host processor 118, such as an operating system (OS) and emulation software 124. The emulation software 124 includes as a compiler 122 and/or a configuration manager 126. The host memory 120 implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

The communication I/O interface 116 couples the host memory 120 or the host processor 118 to the emulation system 102. The communication I/O interface 116 manages and/or interprets communications with the emulation system 102 over the communication link 105. The communication I/O interface 116 or other support circuit may also receive inputs from user interface devices (e.g., keyboard, mouse) for the OS of the host system 104, informing the OS to, for example, generate an interactive graphical user interface (GUI) to output on a monitor an interactive display configured to receive user inputs from the various user interface devices.

The compiler 122 comprises software configured to convert a hardware design netlist file (e.g., hardware described in a hardware description language (HDL)) into a sequence of processor-executable instructions that can be evaluated by a hardware emulator, executed by the emulation system 102. The compiler 122 may be executed on any number of devices, such as the host system 104 or emulation system 102 shown in FIG. 1A, or another device. The compiler 122 may be a software module component of design or emulation software 124, which may be executed by the host system 104 or emulation system 102; or the compiler 122 may be a standalone software application configured to compile a design file, such as a netlist file.

In operation, the compiler 122 receives and compiles the netlist design file containing design elements into virtual logic of the compiled design, such as the logic gates, of the IC design currently being designed and tested (e.g., the DUT). The compiler 122 generates a virtual logic file (representing the IC's logic) based on the compiled netlist. The compiler 122 maps or otherwise associates the IC's logic and timing of operations into the hardware components of the emulation system 102, according to the design of the IC. The compiler 122 generates machine-readable instructions for the components of the emulation system 102 that cause the mapped components of the emulation system 102 to function as the DUT. The compiler 122 or other aspect of the test bench can generate and inject additional processor-executed instructions that manage or control various aspects of the emulation system 102. For example, in addition to the compiled design logic, the virtual logic can also include administrative or overhead instructions related to timing, synchronization, memory management, data transfers, and the like.

The compiler 122 may include a partitioner component and a scheduler component, though it should be appreciated that the compiler 122 may be segmented into any number of discrete component software modules. In an opening import phase, the compiler 122 receives a netlist and then begins compiling the netlist. Here, the compiler 122 parses the logic gates of the netlist into a database format. The partitioner determines which part of the netlist is going to be executed by which hardware resource of the emulation system 102. Then, the scheduler determines which of the hardware resources should execute the resulting instructions generated for each particular part of the netlist. The scheduler may also determine when in the execution lifecycle the virtual logic represented by the netlist should be executed.

The emulation software 124 tracks the status, and controls the performance, of components of the emulation system 102. The emulation software 124 may determine which components of the emulation system 102 are available or unavailable to receive parts of the virtual logic generated by the compiler 122. In some cases, the emulation software 124 continuously polls or self-tests the emulation system 102 for faulty hardware components. In some cases, the emulation software 124 may determine the status of components of the emulation system 102 when the virtual logic is being loaded into the hardware components of the emulation system 102. The designer can use the emulation software 124 to issue queries or instructions to the emulation system 102, such as requesting design-related information at certain points during the execution or instructing the emulation system 102 to execute from a certain breakpoint or for a certain number of steps/cycles.

A configuration manager 126 component of the emulation software 124 tracks the status of compiled instructions and controls the execution of instructions by components of the emulation system 102. The configuration manager 126 may determine which components of the emulation system 102 are available or unavailable to receive parts of the virtual logic generated by the compiler 122. In some cases, the configuration manager 126 continuously polls or self-tests the emulation system 102 for faulty hardware components, and may track the availability of various components of the emulation system 102.

The various software modules 122, 124, 126 may be executed in whole or in part on the host system 104, such as an administrator or IC designer's workstation computer, and configured to communicate data associated with the respective software module 122, 124, 126 to and from the emulation system 102. For example, in some cases, the host system 104 may execute the compiler 122 module that allows a user to input a netlist design file, containing logic gate designs of the prototype IC design, and then compiles the netlist file. The resulting virtual logic generated by the host system 104 may then be transmitted or otherwise downloaded to the emulation system 102. In this example, the emulation system 102 may execute the configuration manager 126 that tracks the availability of resources within the emulation system 102.

Emulation System

The emulation system 102 comprises various hardware (and sometimes software) components are organized physical and logically into any number of racks 103a-103n. The emulation components of the racks 103 include hardware and software for executing the DUT downloaded from the host system 104. It should be appreciated that such logical aspects are mentioned for ease of description and understanding and are not necessarily boundaries or strictly defined sets of components.

The hardware components (and sometimes software) for executing the virtual logic of the DUT, transferring design and/or control data between components, and managing the execution. The emulation system 102 may include an emulation engine configured to be a programmable device used in the verification of hardware design of DUT. The emulation system 102 may test and verify the operation of the DUT, an entire board of integrated circuits, or an entire system, without having to actually, physically fabricate the hardware. The emulation system 102 generally comprises an emulation board. The emulation board comprises emulation chips 130, such as ASICs. The emulation chip 130 comprises several reprogrammable emulation processors, often organized logically into any number of processor clusters 132. The emulation processors mimic the logic gates (or other logic/devices) of the DUT. The emulation system 102 may include any number of programmable logic devices (PLDs), such as FPGAs, to perform or manage aspects of the emulation. Such devices may be coupled to an expansion board for communication via a bus or link, such as a PCI (or PCIe) bus or serial bus.

The synchronization subsystem 110 is a logical collection of hardware components responsible for maintaining synchronization and controlling timing and execution of components of the emulation system 102. At runtime, the emulation system 102 uses the communication link 105 to download design data, configures synchronization logic (including the virtual logic), and initializes or uploads any design memories to the test bench as instructed. Configuration and control of the synchronization system 110 is performed according to instructions communicated via the communication link 105 and/or the busses (e.g., PCI, Infiniband, TCP/IP) to a data processing unit (DPU) and/or to the respective FPGAs, such as TCI 131 FPGAs situated on each of logic boards 129. The synchronization subsystem 110 further includes one or more logical collections of components, including a System Optics Drawer (SOD), a Cluster Control Drawer (CCD), a Logic Drawer (LD), and the TCIs 131 of emulation chips 130.

The emulation system 102 may further comprise an instructional database (not shown) and a resource index database (not shown). The instruction database may store records of virtual logic or instruction sets compiled by the compiler 122 from netlist files. The instruction database may be hosted in non-transitory machine-readable storage medium of any computing device capable of hosting the instruction database and performing the various tasks and processes associated with the instruction database, as described herein. The instruction database may receive, from the compiler 122, instructions compiled from the netlist file of the integrated circuit being tested (e.g., DUT). In some cases, the instructions may be contained within a virtual logic file generated by the compiler 122. At download time, the hardware components of the emulation system 102, such as the instruction memories of the processors, are loaded with the compiled instructions.

Components of a Rack

FIG. 1B is a block diagram showing components of a particular rack 103 of the emulation system 102. The rack 103 includes logic board clusters 128, logic boards 129, emulation chips 130, and buses and/or connection lines of various types to carry data signals between the various components.

The rack 103 may be any physical housing for components of an emulation system 102. In the illustrative system 100, the rack 103 houses a plurality of emulation logic boards 129 that are organized into board clusters 128. The rack 103 may be a computing device, such as a server computer or workstation computer, configured to implement various emulation functions. The rack 103 may physically house components of any type, such as board clusters 128, emulation logic boards 129, emulation chip 130, and buses hosting data signal communications.

The board clusters 128 may be logical and/or physical collectives of one or more logic boards 129. Logic boards 129 may be clustered for any number of reasons, such as creating proximity among a set of logic boards 129 for more efficient signal transfer and processing between the logic boards 129 of the board clusters 128. It should be appreciated that clustering logic boards 129 is often a design consideration, and, as such, other embodiments may cluster and/or disaggregate logic boards 129 according to any number of different organizational patterns. As shown in FIG. 1B, the rack 103 includes board clusters 128, each of the board clusters 128 including six logic boards 129. The board clusters 128 may be interconnected with one another by buses that may carry data signals transmitted to and from the board clusters 128. The buses may interconnect the logic boards 129 of a particular board clusters 128, so that the logic boards 129 may transmit and receive data signals to and from other logic boards within the same board clusters 128.

The emulation logic boards 129 include computing hardware components capable of emulation functionality to emulate the design and functions of the ASIC or other logic system DUT. Non-limiting examples of emulated logic systems include ASICs, CPUs, GPUs, and ALUs, among others. The logic board 129 comprises one or more emulation chips 130 performing the functions used for emulation, and one or more buses interconnecting the emulation chip 130. The buses may be an optical, copper, or any other conductive material capable of carrying data signals. In operation, the buses may carry data signals transmitted to and from the emulation chip 130 of the logic board 129. In some cases, the logic board 129 may include one or more buses supporting communication between emulation chip 130 on the same logic board 129 (i.e., intra-board communication); and, in some cases, the logic board 129 may include one or more buses supporting communication between emulation chip 130 located on other logic boards 129 of the emulator system 102 (i.e., inter-board communication).

The emulation chips 130 may include any number of processors capable of performing the various tasks and processes for emulating an ASIC or other logical processing circuitry, multiplexers configured to direct data signals to and from the processors, buses for communicating data between the processors, and data lanes connecting the components of a processor. The emulator chips 130 may be designed to mimic the functionality of any logic design, based on programmable logic that configures the behavior of the emulator chips 130 to mimic the particular ASIC. In this way, circuitry designers may prototype new logic system design, such as an ASIC design, using processor-based emulation, before actually manufacturing the ASIC and host system 104. The emulation chip 130 may receive a set of instructions to execute from the compiler 122, which may be a software module component executed by a computing device. In operation, the compiler 122 compiles a netlist file representing the ASIC's design. The result of compiling the netlist generates the virtual logic comprising instruction sets for the components (e.g., multiplexers, Boolean processors, etc.) of the emulator chips 130.

In some embodiments, the emulator processors of any emulator chips 130 are organized logically into any number of processor clusters 132a-132f to efficiently share data inputs, data outputs, and data references (e.g., calls to stored data in a data array). For example, multiple processors of an emulator chip 130 may be clustered together such that the processors reference the same data array and/or instruction store of the emulation processors. It should be appreciated that, due to the modular nature of the components of the emulator system 102, the components may be organized into any number of organizational patterns. In some cases, the processor clusters 132a-132f may be clustered into subclusters of the processor clusters 132a-132f. However, it should be appreciated that organizational patterns are not required, and thus, in some embodiments, the emulation processors need not be organized into any processor clusters 132a-132f at all.

Components of an Emulation Chip

FIG. 1C is block diagram of emulation chip 130 of the emulation system 102. The emulation chip 130 includes processor clusters 132a-132f, a sequencer 137 (or other FPGA for controlling device synchronization and execution), and control device 133 (sometimes referred to as control logic circuit). Each processor cluster 132a-132f includes one or more emulation processors for executing the logical operations of the DUT. The emulation chip 130 further includes interfaces with other components of the emulation system 102, allowing the emulation system 102 to move data around the components of the system 100. The interfaces of the emulation chip 130 include the serial bus interface 134, the PCI interface 136, and the synchronization sub system interface 138.

The sequencer 137 is a subset of logic of an FPGA or other logic device (e.g., ASIC) for controlling synchronization and execution by devices of the emulation chip 130 according to signals received from the TCI 131 (of the logic board 129). Each logic board 129 comprises a particular TCI 131 that manages the sequencers 137 of each emulation chip 130 on the particular logic board 129. The emulation chips 130 of the logic board 129 generally interact with the synchronization subsystem 110 through the TCI 131, and the emulation chip 130 generally communicates with the synchronization subsystem 110 via pins that send/receive certain types of data or instructions to/from the TCI 131 of the logic board 129. In operation, the sequencer 137 generates sequences of step or cycle signals ("stepnums") and other sequence-related signals that are driven to the emulation processors and memories of the emulation chip 130. For example, the sequencers 137 receive clock step or cycle ("DSTEP") pulses and/or execution instructions from the synchronization subsystem 110, causing the sequencers 137 to instruct the emulation processors of the emulation chip 130 to perform one or more emulation cycles.

The control device 133 is reconfigurable logic or component of the emulation chip 130 that facilitates management needs unforeseen before runtime and facilitates data transfer (e.g., instructions, design-related data) among components of the system 100. The control device 133 interacts components of the emulation chip 130 by transmitting and receiving hardware control bits (HCBs) that trigger responses by the targeted component and allow the control device 133 to interact with, manage, read, or disrupt execution of the virtual logic. For example, the control device 133 of the chip 130 can communicate state indicators (e.g., RDY) or execution signals (e.g., GO) to the TCI 131 using the HCBs. The TCI 131 transmits a "DSTEP" pulse signal to the various sequencers 137 for the processor clusters 132a-132f, in response to HCBs received from the control device 133. Each sequencer 137 of the processor clusters 132a-132f generates a pre-programmed or instructed sequence of steps for the emulation cycles to perform. Each sequence is a reconfigurable (hardware and/or software) state machine that can generate different subsequences depending on, for example, the number of steps in the emulation instruction, the number of passes through instruction stores per emulation cycle, and various other options. For example, the sequencers 137 can be used to generate sequences independent of the system signals for debug and single-domain emulations (e.g., one processor cluster 132a), and may be configured to support various other runtime functions.

The TCI 131 comprises step-generator logic (stepgen) responsible for issuing pulses (DSTEP) to the sequencers 137 of the emulation chips 130a-130f participating with a given emulation job. These synchronized pulses are used to initiate major cycles, which correspond to a run through the device instruction stores corresponding to a design. The emulation job can be allocated and downloaded to emulation processors on different boards 129 and/or different racks 103, involving a number of TCIs 131 of a number of boards 129. It is nevertheless critical that all stepgens of the relevant TCIs 131 operate in concert to issue DSTEPs to all of the sequencers 137 according to the same system clock. As shown in FIG. 1D, the emulation system 102 relies upon a sync tree to control the stepgens, the DSTEPs, and other aspects of maintaining synchronization. In operation, the step generator of the TCI 131 is configured to send a train of DSTEP pulses with the desired period value, controlled by one or more values stored in a register of the TCI 131.

The control device 133 is logic of the emulation chip 130 that manages operations and data inputs/outputs of the components of the chip 130. The HCBs are a general purpose set of data signals, whereby a hardware or software scheduler logic of the test bench or the emulation system 102 sends scheduled or user-inputted signals to the hardware resources during execution of an emulation cycle. The HCBs implement various controls that depend on the compiled design. As an example, the HCBs access various synchronization-related I/O functions, such as SYNC, INTERRUPT, ERROR, and BREAKPOINT, which are received by the control device 133 via predetermined pins of the emulation chip 130.

At runtime, when hardware is allocated by software executed by the host system 104, the virtual logic is associated with one or more domains (e.g., emulation chips 130a-130f) on each board responsible for execution. Each TCI 131 contains 8 step generators, such that a different design could be run in each domain. When the DUT is loaded for execution in the multiple domains the set of domains are allocated by the configuration manager 126 to a single step generator. The software establishes a second mapping (Multi-board Mapping) when a design spans boards 129. In this case, control signals (HCBs) and/or design-related data from the emulation processors will be passed through SOD and/or the CCD. There are twelve multi-board channels on the CCD and six on SOD available for these connections, which are communicated via the synchronization sub system interface 138.

The PCI interface 136 (or PCIe interface) is the primary interface for runtime communications, diagnostics, and management communications with the host system 104, which includes transmitting DPI messages to the host system 104. The PCI interface 136 is used for downloading the design to the components of the emulation chips 130 (or other components of the emulation system 102) and transmitting data containing information about the emulation performance or management. For example, the PCI bus can carry configuration instructions for a serializer-deserializer (SERDES) component of the serial bus interface 134. Additional, non-limiting examples of communications conducted through the PCI interface 136 may include trace upload; runtime operation such as emulation operations (clocking, querying signals, depositing and forcing values); dynamic netlist operations (reconfiguring probes, breakpoints); simulation acceleration data; and others.

The serial bus interface 134 transmits design data between emulation chips 130. The emulation chips 130 may be on the same board or on another board in the same board cluster. The serial bus may also transmit design data between emulation chips 130 on another board in different clusters in the same rack-pair (via optics), to chips 130 in another rack-pair (via optics), among other destinations.

Example Synchronization Subsystem

Figure 2:
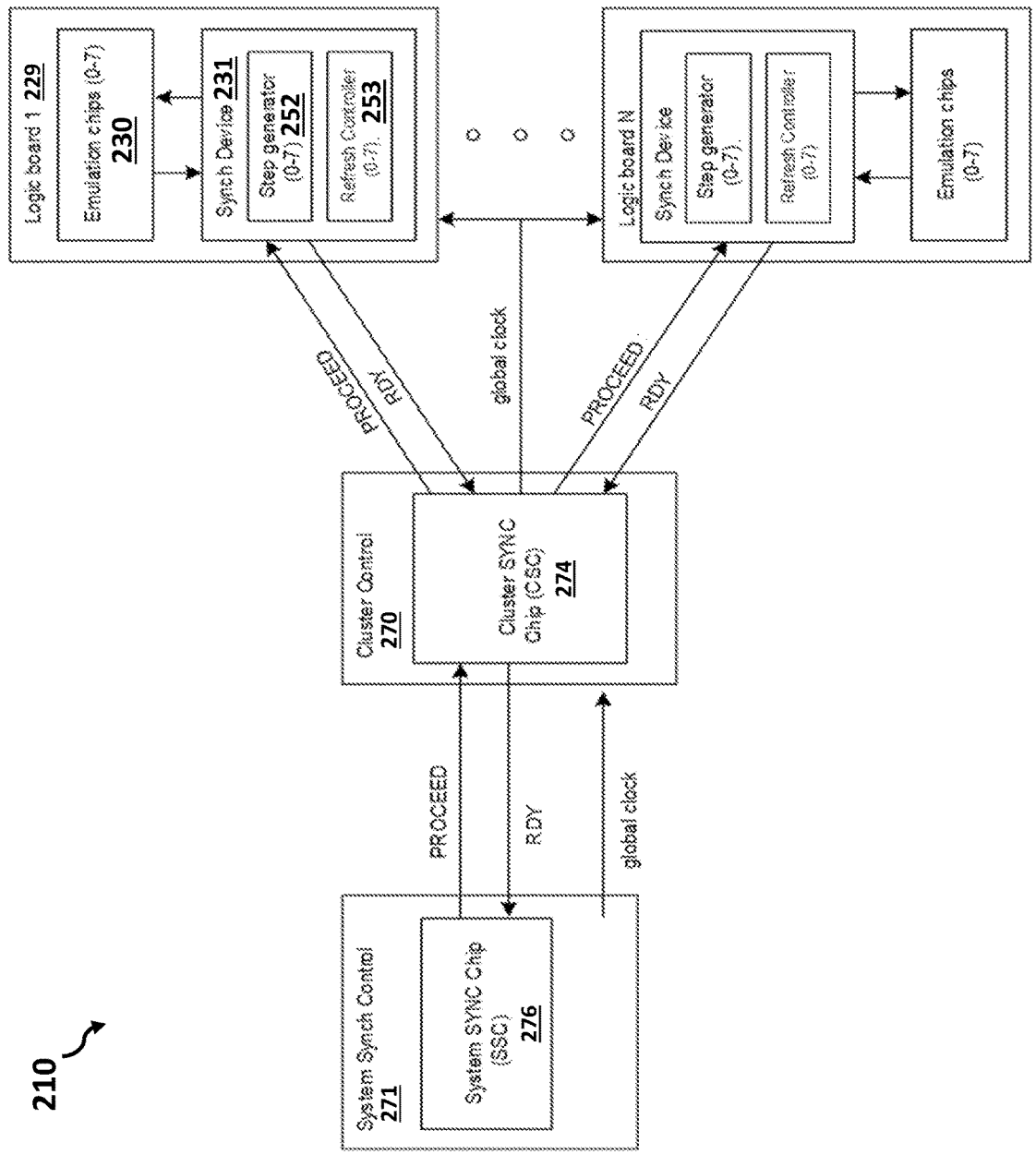
FIG. 2 is a block diagram depicting components of a synchronization subsystem in an emulation system, according to an embodiment.

FIG. 2 is a block diagram depicting components of a synchronization subsystem 210 in an emulation system, according to an embodiment. Emulation chips 230 provide a logic resource for emulation jobs running on the emulation system. The emulation chips 230 assigned to perform the same emulation job need to run synchronously, even when such emulation chips 230 are on one or more logic boards 229. The synchronization subsystem 210 may provide synchronization functions to run the emulation chips 230 synchronously.

In some embodiments, the synchronization subsystem 210 implements a tree structure to apply synchronization functions at different levels, for example, at a system level, at a cluster level, or at a logic board level. The synchronization subsystem 210 includes a system synchronization control module 271 that applies a synchronization function at a system level, a cluster synchronization control module 270 that applies a synchronization function at a cluster level, and a plurality of synchronization devices 231a-231n (e.g., TCIs) that apply synchronization functions at a logic board level. The system synchronization control module 271 may include an SSC 276 and software or firmware instructions configured to supervise the SSC 276. The cluster synchronization control module 271 may include a cluster synchronization chip (CSC 274) and software or firmware instructions configured to supervise the CSC 274. A common or global clock signal may be distributed to each of the synchronization control modules 271, 270 and the synchronization devices 231a-231n. In some embodiments, the global clock signal may be a low-skew global clock.

Using a tree structure of synchronization control modules, the synchronization functions can be cascaded to form a network tree of synchronization lines that ultimately synchronizes all of the clusters in the system. For example, CSC 274 may receive PROCEED (sometimes referred to herein as "GO" or an "execute" instruction) signals from the SSC 276 and drive or forward the PROCEED signals to the synchronization devices 231a-231n, respectively. Upon receiving the PROCEED signal, the CSC 274 may coordinate corresponding logic boards 229 in the same cluster so that the logic boards 229 in the same cluster can operate in synchronization with each other. Likewise, upon receiving the PROCEED signals, each synchronization device 231a-231n on a corresponding logic board may coordinate emulation chips 230 on the board 229 to relay and combine signals to/from the emulation chips 230 so that the emulation chips 230 on the same board 229 can operate in synchronization with each other. For example, upon receiving the PROCEED signal, the synchronization device 231a-231n on the logic board 229 may send signals to, or receive signals from, eight emulation chips 230 on the same logic board 229. Similarly, upon receiving the PROCEED signal, the synchronization device 231a-231n on another logic board 229 may send signals to, or receive signals from, eight emulation chips 230 on the same logic board 229.

In some embodiments, each downstream device (e.g., synchronization devices 231a-231n or CSC 274) may send a RDY (sometimes called a ready status indicator) signal to the upstream device (e.g., CSC 274 or SSC 276), thereby indicating the downstream device is ready to proceed or operate in synchronization with the corresponding upstream device. For example, each synchronization device 231a-231n sends the RDY signal to the CSC 274, indicating that the synchronization device 231a-231n is ready to proceed or operate in synchronization with CSC 274. Similarly, the CSC 274 sends RDY signal to the SSC 276, indicating that the CSC 274 is ready to proceed or operate in synchronization with SSC 276. The upstream device may collect the RDY signals from the downstream device(s) and generate PROCEED signal(s) using a software programmable logic, for example. Then, the PROCEED signal may be sent to all the downstream devices. In some embodiments, the PROCEED signal may need to be synchronized and received by all of the downstream device at the same time, while the READY signals may not need to be synchronized. The upstream device may collect the READY signals sent from corresponding downstream device(s), and once the last READY signal is received, then the upstream device generate PROCEED signal(s) sent the PROCEED signal(s) in matched phase to all downstream devices.

Each synchronization device 231a-231n may include a step generator 252 and a refresh controller 253 to manage synchronization among the emulation chips 230, where the step generator 252 and the refresh controller 253 provide different operations. Generally, the step generator 252 generates signals for the emulation chips 230 (of the logic board 229) to perform one or more steps of design emulation. The refresh controller 253 may generate a refresh signal instructing an emulation chip 230 on the same logic board 229 to perform refreshes on memories of that emulation chip 230. The signals sent from each synchronization device 231 to corresponding emulation chips 230 may include step signals generated by the step generator 252 of that synchronization device 231 and/or refresh signals generated by the refresh controller 253 of that synchronization device 231.

In some embodiments, the signals sent from the emulation chips 230 on the same board 229 to the corresponding synchronization device 231 may include, for example, breakpoint signals generated by the emulation chips 230 to stop generating step signals and/or synchronization output (SYNCO) signals generated by the emulation chips 230 to indicate that the emulation chips 230 are ready to operate in synchronization with the synchronization device 231. In some embodiments, each synchronization device 231 may send the RDY signal to the CSC 274 in response to receiving all relevant SYNCO signals from all the emulation chips 230 on the same board 229. Each synchronization device 231 may send step signals to emulation chips 230 on the same board 229 when in response to receiving the PROCEED signal issued from the CSC 274.

Example Sync Tree

Figure 3:
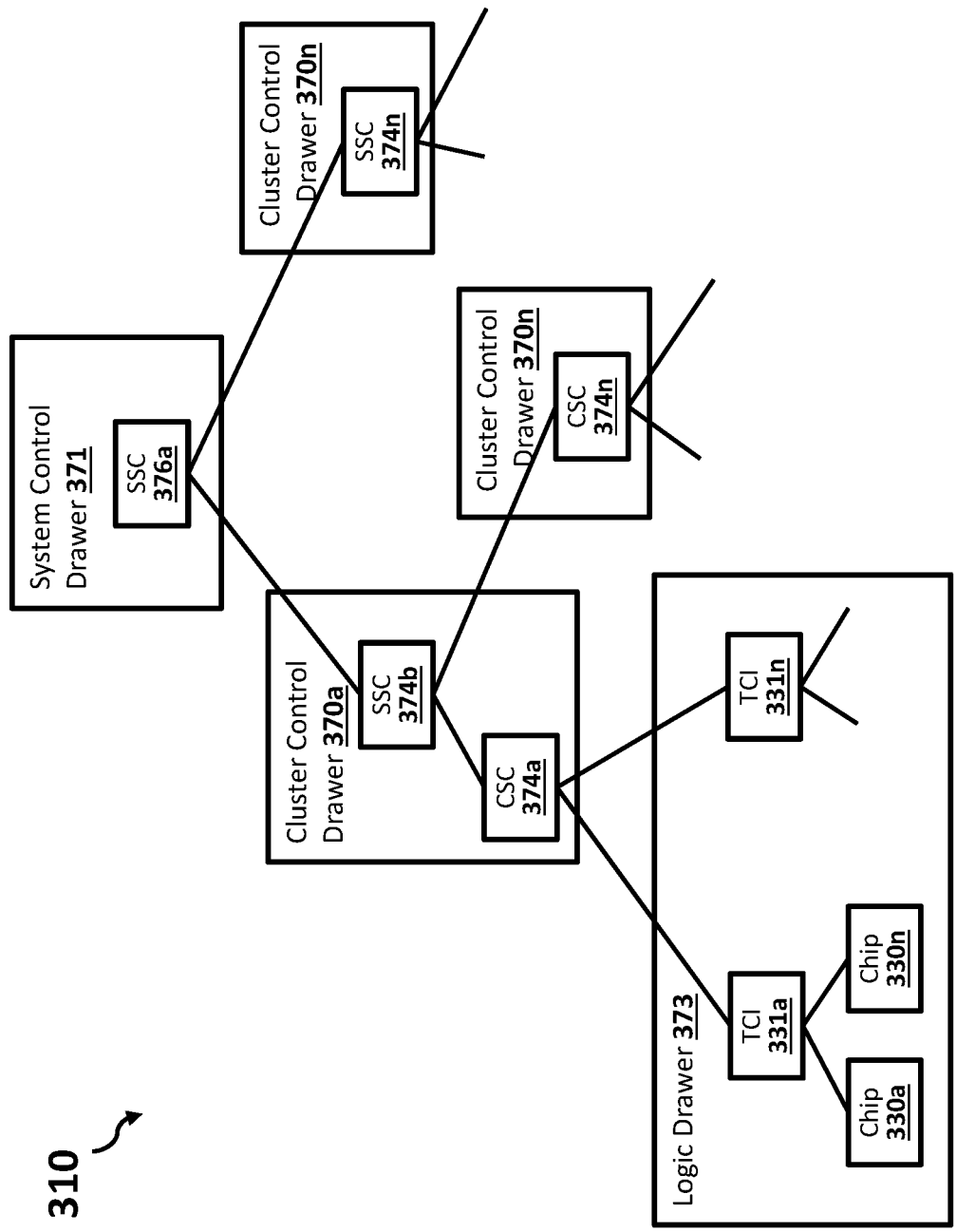
FIG. 3 shows components of the synchronization subsystem of the emulation system organized logically as the sync tree, according to an embodiment.

FIG. 3 shows components of a synchronization subsystem 310 of the emulation system organized logically as the sync tree, according to an embodiment. The system control drawers (SODs 371) (sometimes referred to as system optics drawers) and cluster control drawers (CCDs 370a-370n) comprise a CSC 376 and/or SSC 374. The LDs 373 comprise TCIs 331a-331n of logic boards. These various FPGAs of the synchronization subsystem 310 communicate with another and other aspects of the emulation system via various buses, such as PCIe or InfiniBand.

The sync tree is a logical representation of the components involved with the synchronization subsystem 310. Nodes of the tree are FPGAs (e.g., TCI 331, CSC 374, SSC 376) or emulation processors of emulation chips 330a-330n. Edges of tree represent the various data channels (e.g., data busses) between the nodes. Leaf nodes represent emulation processors. The nodes transmit signals bi-directionally. The upward direction (from child to parent) is called "RDY" (or state indicators) and the downward direction is called "GO" (or execution instruction). Transmission of GO has a fixed latency, which is identical for all edges of the same level of hierarchy, such that the busses hosting the edges of the sync tree are designed to ensure that a GO originating at some node is propagated to all children with a fixed and equal latency.

To maintain synchronization for multiple components situated across any number of racks, step generators (e.g., step generators 252) of each TCI 331 must trigger execution by sequencers of the emulation chips 330a-330n at the same time, according to the same clock cycle. Ordinarily, each participating TCI 331 asserts a RDY state indicator that is transmitted upwards to each parent node device (e.g., CSC 374 or SSC 376). A root node of the tree (e.g., root parent CSC 374 or SSC 376) performs a logical determination (e.g., bitwise AND of all RDYs) that the root node has received the RDY state indicator from each child TCI 331a-331n. The root node then generates and asserts an execution instruction (GO) that propagates downwards, reaching each TCI 331a-331n at the same system clock. The step generator of each TCI 331a-331n is configured to issue signals to the emulation chips 330a-330n when the GO instruction/assertion is received by the TCI 331a-331n. The TCI 331-331n issues the signals to the emulation chips 330a-330n via control devices (e.g., control device 133) situated on each of the emulation chips 330a-330n and/or logic boards.

To improve upon conventional approaches, the synchronization subsystem 310 operates in a "master-slave mode." In prior approaches, a "run N" mode included serially re-arming each TCI 331a-331n involved after starting or stopping the leaf emulation processors 330a-330n following a "run" of N cycles. This approach can be inefficient to implement, particularly for large designs, where the approach does not scale well for large emulation jobs. It would be preferable to start and stop the leaf emulation processors 330a-330n by manipulating only one of the step generators of the TCIs 331a-331n. As such, in the master-slave mode, one of the TCIs 131a-131n is designated a master TCI 331a and the remaining TCIs 131a-131n are designated slave TCIs 331n, where the synchronization subsystem starts/starts the emulation by manipulating only the master TCI 131a.

The slave TCIs 331n are configured once at initialization. The slave TCIs 331n constantly drive a RDY state upwards and remain in "run infinite" mode. The slave TCIs 331n, however, remain sensitive to a GO instruction. The master TCI 331a is reprogrammed each time new cycles are desired, according to, for example, instructions from a host system or a predetermined breakpoint in the code. The master TCI 331a is likewise sensitive to GO, but the master TCI 331a executes in the run N mode, such that the master TCI 331a sends one or more signals instructing the emulation processors (of the emulation chips 330a-330n) to perform the N cycles and de-assert the RDY state at the last cycle. If the RDY state de-asserts anywhere, then the GO will synchronously de-assert everywhere. The de-assertion propagates up the synch tree from the master TCI 131a, causing the root node (e.g., SSC 376) to de-assert the GO down the tree. In this way, an instruction (e.g., pause/unpause) from the host system or virtual logic (e.g., breakpoint) need only to instruct the master TCI 331a to halt execution by de-asserting the RDY state for the master TCI 331a. After running N number of cycles or in response to receiving an interrupt or pause instruction, the master TCI 331a and/or the control device clears the RDY state asserted for the master TCI 331a.

In some implementations, a host system executing test bench software, controlling and configuring the emulation system's operations, transmits operational instructions to whether the emulation system proceeds/halts execution or whether the emulation system proceeds with a certain number of cycles, among other configurations. The test bench software can, for example, instruct the emulation system to execute a certain number of cycles or steps, start/stop execution, or pause/unpause execution. The test bench software can communicate with various levels of the synchronization subsystem 310. For instance, the test bench software can communicate instructions to SSC 376, the CSC 374, or to the master TCI 371a.

In some cases, it is quickest or most efficient for the test bench software to communicate instructions to one of the emulation chips 330a on the logic board of the master TCI 331a. In such cases, one of the emulation chips 330a connected to the master TCI 331a is configured to signal start/stop conditions by driving a PROCEED or RDY signal upwards to the master TCI 331a. As an example, for efficiency, it is common to require the emulator system to run a predetermined number of cycles (oftentimes, only one cycle). The test bench can efficiently trigger the emulation system to perform just one cycle to the master TCI 331a by signaling the PROCEED or RDY state to the designated emulation chip 330a (which in turn drives the PROCEED/RDY state signal upwards to the master TCI 331a), without needing to reprogram the master TCI 331a to, for example, "run 1 cycles," which is typically slower and requires several accesses to the master TCI 331a FPGA.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for managing execution of an emulator system, the method comprising:
   receiving, by a synchronization chip, a plurality of state indicators from a plurality of slave board timing control devices for a plurality of first emulation chips associated with the plurality of slave board timing control devices, the plurality of state indicators corresponding to a ready state for the plurality of first emulation chips; and
   responsive to the synchronization chip receiving a state indicator from a master board timing control device for a second emulation chip associated with the master board timing control device indicating a master ready state for the second emulation chip,
      transmitting, by the synchronization chip, an execution instruction to the plurality of slave board timing control devices and to the master board timing control device.

2. The method according to claim 1, further comprising executing, by the first emulation chips and the second emulation chip, one or more emulation cycles in response to the execution instruction.

3. The method according to claim 1, wherein each slave board timing control device is configured to transmit a signal to a subset of first emulation chips of a corresponding logic board, and wherein the method further comprises:
   transmitting, by the master board timing control device, an execute signal to the second emulation chip associated with the master board timing control device.

4. The method according to claim 1, wherein the master board timing control device is configured to transmit signals to the second emulation chip of a corresponding logic board, and wherein the method further comprises:
   transmitting, by the plurality of slave board timing control devices, an execute signal to the plurality of first emulation chips associated with the plurality of slave board timing control devices.

5. The method according to claim 1, further comprising:
   receiving, by the synchronization chip, a master unready state indication from the master board timing control device, the master unready state indication de-asserting the master ready state; and
   transmitting, by the synchronization chip, a de-assertion of the execution instruction to each slave board timing control device.

6. The method according to claim 5, responsive to each slave board timing control device receiving the de-assertion of the execution instruction from the synchronization chip:
   transmitting, by the plurality of slave board timing control device, a second signal to the plurality of first emulation chips to halt execution.

7. The method according to claim 1, wherein each slave board timing control device continually indicates the ready state to the synchronization chip.

8. The method according to claim 1, wherein the master board timing control device indicates the master ready state according to a control logic of the second emulation chip coupled to the master board timing control device.

9. The method according to claim 8, further comprising receiving, by the master board timing control device, from the control logic of the second emulation chip an instruction signal for the second emulation chip to perform one or more emulation cycles.

10. The method according to claim 1, further comprising clearing, by the master board timing control device, the ready state responsive to the plurality of first emulation chips and the second emulation chip executing a predetermined amount of emulation cycles.

11. An emulator system comprising:
   a plurality of emulation chips configured to perform portions of emulation cycles;
   a plurality of slave board timing control devices configured to control execution timing of a plurality of first emulation chips of the plurality of emulation chips;
   a master board timing control device configured to control execution timing of a second emulation chip of the plurality of emulation chips; and
   a synchronization chip configured to:
      receive from the plurality of slave board timing control devices a plurality of state indicators corresponding to the plurality of first emulation chips indicating a ready state;
      receive from the master board timing control device a state indicator for the second emulation chip indicating a master ready state for the second emulation chip; and
      transmit an execution instruction to the plurality of slave board timing control devices and to the master board timing control device in response to receiving the master ready state.

12. The system according to claim 11, wherein the plurality of first emulation chips and the second emulation chip are configured to execute one or more emulation cycles in response to the execution instruction.

13. The system according to claim 11, wherein each slave board timing control device is configured to transmit a signal to a subset of first emulation chips of a corresponding logic board, and
   wherein the master board timing control device is configured to transmit an execute signal to the second emulation chip.

14. The system according to claim 11, wherein the synchronization chip is configured to:
   receive a master unready state indication from the master board timing control device, the master unready state indication de-asserting the master ready state; and
   transmit a de-assertion of the execution instruction to each slave board timing control device.

15. The system according to claim 14, wherein responsive to receiving the de-assertion of the execution instruction from the synchronization chip each slave board timing control device is configured to:
 transmit a second signal to the each of the first emulation chips to halt execution.

16. The system according to claim 11, wherein each slave board timing control device is configured to continually indicate the ready state to the synchronization chip.

17. The system according to claim 11, wherein the master board timing control device is configured to indicate the master ready state according to a control logic of the second emulation chip coupled to the master board timing control device.

18. The system according to claim 17, wherein the master board timing control device is configured to receive from a control logic of the second emulation chip an instruction signal for the second emulation chip to perform one or more emulation cycles.

19. The system according to claim 11, wherein the master board timing control device is configured to clear the ready state responsive to the plurality of first emulation chips and the second emulation chip of the emulator system executing a predetermined number of emulation cycles.

20. The system according to claim 11, further comprising one or more logic boards comprising one or more emulator processors, each logic board comprising a board timing control device configured to send signals to the one or more emulator processors of the corresponding logic board.

* * * * *